(12) United States Patent
Oksman (10) Patent No.: US 7,694,748 B2
(45) Date of Patent: Apr. 13, 2010

(54) ROCK BREAKING MACHINE AND LUBRICATING METHOD

(75) Inventor: Mika Oksman, Hollola (FI)

(73) Assignee: Sandvik Mining and Construction Oy, Tampere (FI)

( * ) Notice: Subject to any disclaimer, the term of this patent is extended or adjusted under 35 U.S.C. 154(b) by 0 days.

(21) Appl. No.: 11/216,452

(22) Filed: Sep. 1, 2005

(65) Prior Publication Data

US 2006/0048957 A1  Mar. 9, 2006

(30) Foreign Application Priority Data

Sep. 3, 2004  (FI) ................................. 20045323

(51) Int. Cl.
*B25D 17/26* (2006.01)
*B23B 45/16* (2006.01)
(52) U.S. Cl. .................. 173/77; 173/DIG. 3; 30/123.3; 184/7.2; 184/7.3
(58) Field of Classification Search ............ 173/DIG. 3, 173/13–17; 30/123.3–123.4
See application file for complete search history.

(56) References Cited

U.S. PATENT DOCUMENTS

| | | | | |
|---|---|---|---|---|
| 1,629,730 | A | * | 5/1927 | Penberthy .................... 173/97 |
| 1,846,819 | A | | 2/1932 | Smith, Jr. |
| 1,971,772 | A | * | 8/1934 | Curtis ......................... 173/79 |
| 1,968,901 | A | | 10/1934 | Nell |
| 2,869,374 | A | | 1/1959 | Morris |
| 3,193,028 | A | | 7/1965 | Radizimovsky |
| 3,487,892 | A | * | 1/1970 | Kiefer ........................ 184/27.1 |
| 3,490,549 | A | | 1/1970 | Catterson |
| 3,661,216 | A | | 5/1972 | Yamanaka |
| 3,664,462 | A | * | 5/1972 | Smith, Sr. ..................... 184/7.4 |
| 3,749,186 | A | * | 7/1973 | Kutuzov et al. .............. 175/228 |
| 3,774,700 | A | * | 11/1973 | Shepherd .................... 173/203 |
| 3,966,019 | A | * | 6/1976 | Heikkila et al. .............. 184/7.4 |
| 4,149,602 | A | * | 4/1979 | James ........................ 173/207 |
| 4,157,121 | A | * | 6/1979 | Amtsberg et al. ............ 173/95 |
| 4,190,116 | A | | 2/1980 | O'Neal et al. |
| 4,289,209 | A | * | 9/1981 | Salmi ........................ 173/107 |
| 4,333,538 | A | * | 6/1982 | Ekwall ....................... 173/104 |

(Continued)

FOREIGN PATENT DOCUMENTS

EP  0 486 752 A  4/1991

(Continued)

OTHER PUBLICATIONS

Opposition dated Jun. 23, 2008 issued in EP Application No. 1 632 636.

*Primary Examiner*—Rinaldi I. Rada
*Assistant Examiner*—Lindsay Low
(74) *Attorney, Agent, or Firm*—Drinker Biddle & Reath LLP (57) ABSTRACT

A rock breaking machine and to a method of lubricating a tool of a rock breaking machine. The lubricating system comprises at least one lubricant channel (23) into which lubricant is fed by a lubricating device (24). Lubricant is supplied to the bearing members (19) of the tool (6, 13) of the rock breaking machine. The lubricating device comprises a lubricant container (25) and a transfer device (26). The transfer device (26) controls the feed of lubricant into the lubricant channel. The lubricant container (25) is integrated into the body (17, 18) of the rock breaking machine.

14 Claims, 7 Drawing Sheets

U.S. PATENT DOCUMENTS

| | | | |
|---|---|---|---|
| 4,474,248 A * | 10/1984 | Musso | 173/17 |
| 4,793,719 A * | 12/1988 | Crockett et al. | 384/92 |
| 5,060,761 A | 10/1991 | Arndt | |
| 5,293,959 A * | 3/1994 | Kimberlin | 184/6.14 |
| 5,351,763 A * | 10/1994 | Muuttonen | 173/210 |
| 5,385,209 A * | 1/1995 | Bodell et al. | 173/62 |
| 5,549,031 A * | 8/1996 | Giordano | 91/284 |
| 5,562,170 A | 10/1996 | Wolfer et al. | |
| 6,070,678 A * | 6/2000 | Pascale | 175/300 |
| 6,273,199 B1 * | 8/2001 | Kiikka et al. | 173/1 |
| 6,405,810 B1 * | 6/2002 | Grach et al. | 175/52 |

FOREIGN PATENT DOCUMENTS

| | | |
|---|---|---|
| EP | 1 321 245 A | 6/2003 |
| JP | 57-190894 | 11/1982 |
| WO | WO 03/053639 A | 7/2003 |

\* cited by examiner

ROCK BREAKING MACHINE AND LUBRICATING METHOD

BACKGROUND OF THE INVENTION

The invention relates to a rock breaking machine comprising: a body; a percussion device for generating impact pulses in a tool that is connectable to the rock breaking machine, bearing members for supporting the tool onto the rock breaking machine and a lubricating system for lubricating the bearing members. The lubricating system comprises at least one lubricant channel, and at least one lubricating device for feeding lubricant along the lubricant channel to the bearing members of the tool. The lubricating device comprises at least one lubricant container and a transfer device for feeding lubricant, the lubricant container being arranged in the body of the rock breaking machine.

The invention further relates to a method of lubricating a tool of a rock breaking machine.

Rock breaking machines, such as impact hammers and rock drilling machines, comprise a tool which is provided with impact pulses by a percussion device of the rock breaking machine. Due to the influence of the impact pulses, the tool breaks the material being operated on and penetrates into it. The tool is bearing-mounted in the body of the rock breaking machine so that it can move in the longitudinal direction during the operation of the rock breaking machine. Furthermore, in rock drilling machines the tool is typically rotated about its longitudinal axis during drilling. The tool of the rock breaking machine and its bearings are subjected to heavy stress during use. Thus it is known to provide a rock breaking machine with a lubricating device for feeding lubricant to the tool's bearing means. The lubricating device comprises a lubricant container and a lubricant pump, which are typically arranged on the outer surface of the rock breaking machine, for example in a protective case surrounding the rock breaking machine. In that case, the lubricating device is prone to impacts and impurities during use. A further problem that has been noted is that it is difficult to feed lubricant from a remote lubricant container into the bearing members. In cold conditions, in particular, lubrication may be insufficient since the lubricant is cold and stiff in the lubricant container arranged on the outer surface of the rock breaking machine.

BRIEF DESCRIPTION OF THE INVENTION

The object of the invention is to provide a new and improved rock breaking machine and a method for lubricating a tool of a rock breaking machine.

The rock breaking machine according to the invention is characterized in that the volume of the lubricant container is divided into a pressure space and a lubricant space by a dividing member, which is arranged to affect the volumes of the pressure space and lubricant space; the pressure space is connected to a pressure medium channel, which allows pressurization of the pressure space by feeding pressure medium therein; lubricant is storable in the lubricant space; the pressure of the pressure medium acting in the pressure space is arranged to pressurize the lubricant in the lubricant space by means of the dividing member; and that the lubricant space is connected to a transfer device, which is arranged to control the feed of lubricant from the lubricant space into the lubricant channel.

The method according to the invention is characterized by storing lubricant in a lubricant space provided in the lubricant container; supplying the pressure of pressurized medium to the pressure space of the lubricant container, the pressure space being separated from the lubricant space by means of a dividing member; pressurizing the lubricant in the lubricant space by pushing the dividing member towards the lubricant space by means of pressure medium; and batching a predetermined portion of lubricant into the lubricant channel by the lubricating device.

The basic idea of the invention is that a lubricant container included in the lubricating system is arranged in connection with the body of the rock breaking machine. The body of the rock breaking machine is provided with a space for a lubricant container. Furthermore, the volume of the lubricant container is divided into a pressure space and a lubricant space by means of a dividing member. In that case, the dividing member is arranged to affect the size of the volumes of the pressure space and lubricant space. Pressure medium can be fed from a pressure medium channel into the pressure space, which enables pressurization of the pressure space. Lubricant can be stored in the lubricant space by feeding it along a feed channel, by arranging a lubricant cartridge in the lubricant space or by filling the lubricant space in another manner. Furthermore, the pressure of the pressure medium acting in the pressure space is arranged to pressurize the lubricant in the lubricant space by means of a dividing member, whereby lubricant may flow from the lubricant space to a transfer device, which controls the feed of lubricant into the lubricant channel.

An advantage of the invention is that lubricant in the lubricant container arranged in the body warms up according to the operating temperature of the rock breaking machine, thus allowing effective lubrication in cold conditions, too. Warm lubricant flows easier than cold and stiff lubricant. The transfer of lubricant from the lubricant container according to the invention to the object to be lubricated poses no problems. Since the solution according to the invention ensures sufficient lubrication of the tool of the rock breaking machine in all conditions, the operating life of the tool and rock breaking machine may be longer and the need for service less frequent. A further advantage is that the dividing member keeps the lubricant and the pressure medium separate from each other, in which case no lubricant is allowed into the pressure medium system nor any pressure medium into the lubricating system. This ensures functioning of the lubricating system and pressure medium system.

The basic idea of an embodiment according to the invention is that in addition to the lubricant container, the lubricant channel and lubricating device included in the lubricating system are integrated into the body of the rock breaking machine. In that case, the distance from the lubricant container to the lubricating device and further to the object to be lubricated may be short. A further advantage is that the whole lubricating system is covered by the body of the rock breaking machine. The temperature of the lubricant in the lubricant container, transfer device and lubricant channel may further substantially correspond to the operating temperature of the rock breaking machine. Neither does this embodiment require any lubricant hoses, which makes the structure more durable and the need for service less frequent.

The basic idea of an embodiment according to the invention is that the transfer device may be a valve for controlling the flow of lubricant, or the transfer device may comprise a pumping member for further increasing the lubricant pressure.

The basic idea of an embodiment according to the invention is that the lubricant container is a cylindrical space which is formed in the body of the rock breaking machine and is divided into a pressure space and a lubricant space by a dividing member. The dividing member is a piston, which is sealed against the cylinder surfaces of the lubricant container.

The piston is arranged to move freely in the longitudinal direction of the lubricant container, depending on the pressure difference between the pressures acting in the pressure space and lubricant space. The forming of such a cylindrical space in the body of the rock breaking machine is relatively simple.

The basic idea of an embodiment according to the invention is that the lubricant container is a space provided with at least one medium membrane, such as a pressure bag. The medium membrane divides the volume of the lubricant container into a pressure side and a lubricant side. If the medium membrane is a bag arranged in the lubricant container, lubricant may be inside the bag and the pressure of the pressure medium may act in the space defined by the outer surface of the bag and the inner surface of the lubricant container, or vice versa, i.e. the lubricant is outside the bag and the pressure medium is inside the bag.

The basic idea of an embodiment according to the invention is that the transfer device included in the lubricating device is arranged to control the feed of pressurized lubricant from the lubricant space of the lubricant container into the lubricant channel. The transfer device comprises a feed element provided with a feed space for receiving a predetermined portion of lubricant from the lubricant container as the transfer device is loaded for feeding lubricant. The feed element further comprises a push member arranged to push the lubricant portion provided in the feed space into the lubricant channel when the feed element is triggered according to a predetermined control strategy. The transfer device may be loaded during the normal use of the rock breaking machine and triggered when the normal use is interrupted. When a pressure medium operated percussion device is concerned, the transfer device may be loaded as the percussion device is pressurized, and the triggering may take place as the percussion device is stopped and the pressure discharges therefrom.

The basic idea of an embodiment according to the invention is that the body of the rock breaking machine is provided with a hollow space and that the lubricant container is a detachable part that can be arranged in this hollow space. In that case, the lubricant container may be manufactured as a part separate from the body, which may facilitate the manufacture. Furthermore, if necessary, the lubricant container can be detached from the body for service and lubricant filling, for instance. During the use, however, the lubricant container is inside the body of the rock breaking machine.

BRIEF DESCRIPTION OF THE FIGURES

The invention will be described in greater detail in the accompanying drawings, in which.

For the sake of clarity, the figures illustrate some embodiments of the invention in a simplified manner. Like reference numbers refer to like parts in the figures.

DETAILED DESCRIPTION OF SOME EMBODIMENTS OF THE INVENTION

Figure 1:
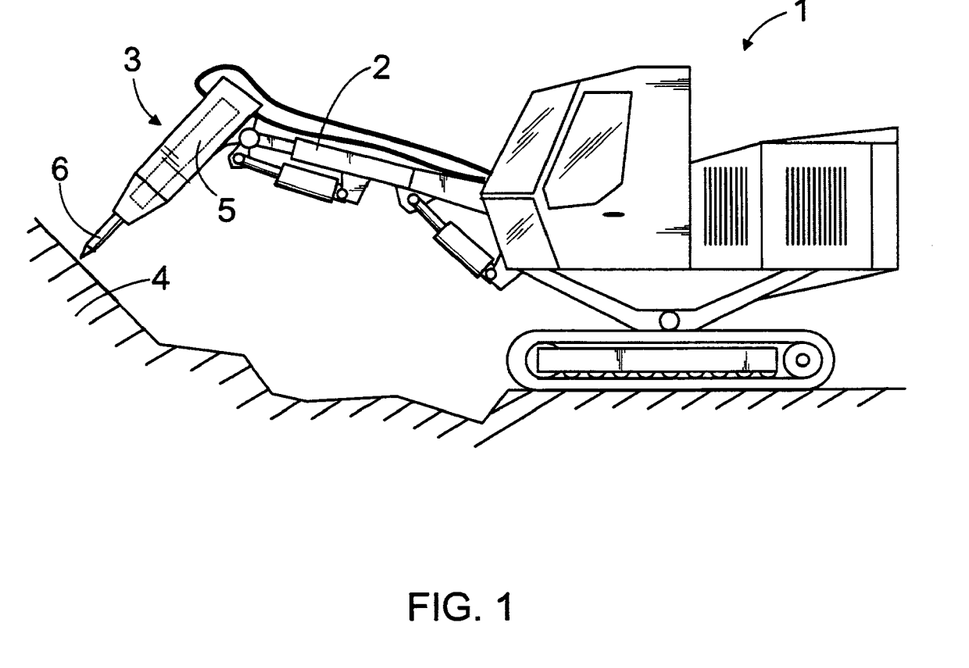
FIG. 1 is a schematic side view of a rock breaking machine, which in this case is an impact hammer arranged in an excavator boom, FIG. 2 schematically illustrates another rock breaking machine, which in this case is a rock drilling machine arranged in a boom of a rock drilling rig.

In FIG. 1, an impact hammer 3 is arranged in a boom 2 of an excavator 1. The impact hammer 3 can be pressed against the material 4 to be broken by means of the boom 2 while a percussion device 5 provided in the impact hammer 3 provides impact pulses for a tool 6 connected to the impact hammer 3. The tool 6 transmits the impact pulses to the material 4 that is being operated on, such as rock, concrete or another hard material, and makes it break. The impact hammer 3 may be arranged in any movable basic machine or, for example, in a drilling boom mounted in a fixed base. The impact hammer 3 may be operated by pressure medium, in which case it may be connected to the hydraulic system of an excavator 1 or the like. On the other hand, the percussion device 5 of the impact hammer 3 may be electrically operated or in any other way.

Figure 2:
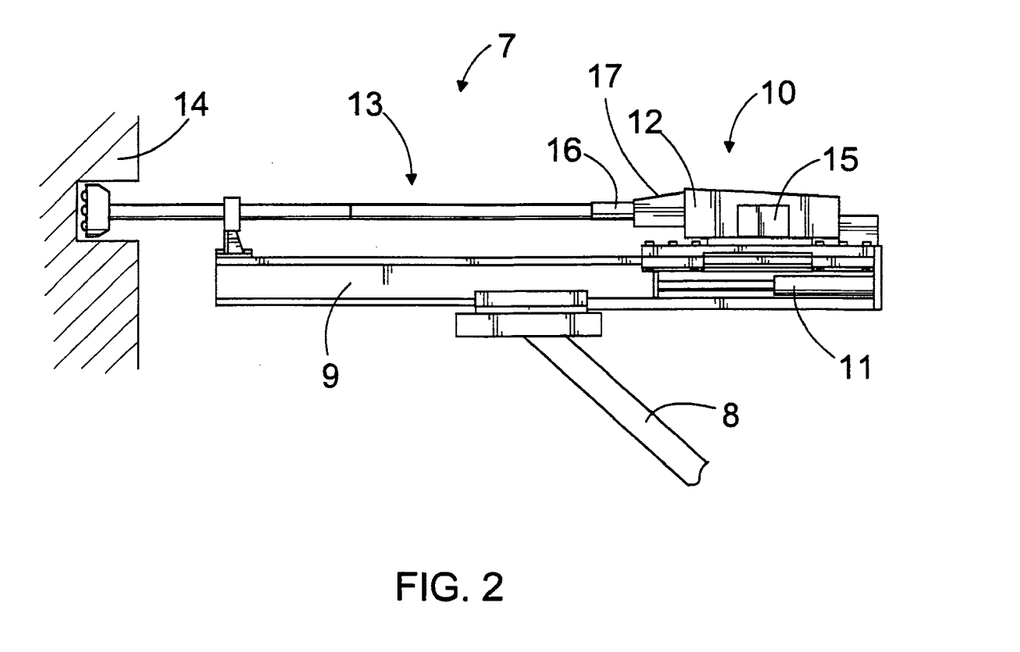

FIG. 2 illustrates a rock drilling unit 7, which may be arranged in a drill boom 8 of a rock drilling rig. The rock drilling unit 7 may comprise a feed beam 9 and a rock drilling machine 10, which can be moved by the feed beam 9 by means of a feed device 11. The rock drilling machine 10 may comprise a percussion device 12 for providing impact pulses for a tool 13 connected to the rock drilling machine so that the material 14 to be drilled breaks and the tool 13 can penetrate into the material. The rock drilling machine 10 may further comprise a rotation device 15 for rotating the tool 13 about its longitudinal axis during drilling. The rock drilling machine 10 may be provided with a lubricating system according to the invention for feeding lubricant to the bearing surfaces of the tool at the end towards the rock drilling machine 10. The tool 13 is typically connected to a shank 16 included in the rock drilling machine 10, in which case bearing members supporting the tool 13 are formed between the shank 16 and the body 17 of the rock drilling machine. In this application, the shank and other components connected to the tool are also regarded as part of the tool.

Figure 3:
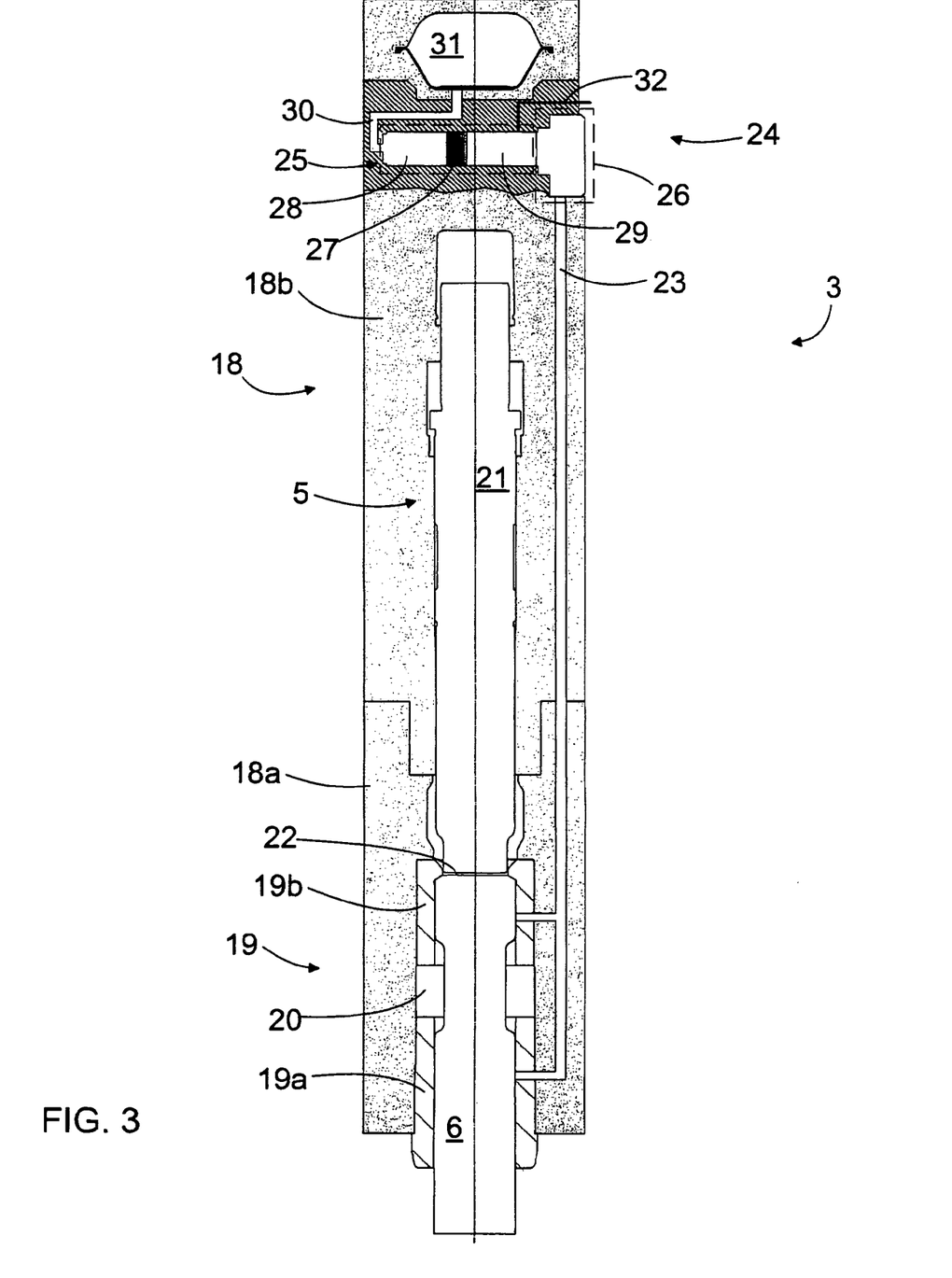
FIG. 3 is a schematic and cross-sectional view of the structure of an impact hammer which is provided with a lubricating system according to the invention, FIG. 4 schematically illustrates a lubricating system according to the invention and components included therein, FIGS. 5 to 7 schematically illustrate the operation of the lubricating system according to FIG. 4.

FIG. 3 is a cross-sectional view of the structure of an impact hammer 3. The impact hammer 3 includes a body 18, which may comprise a front body 18a and a rear body 18b. The body 18 may also consist of a single piece only, or alternatively, it may consist of more than two pieces. The front body 18a may comprise one or more bearing means 19 for supporting the tool 6 onto the body 18. As shown in FIG. 3, the bearing means 19 may comprise a first bearing sleeve 19a and a second bearing sleeve 19b, which may be slide bearings. The bearing means 19 allow the tool 6 to move in the axial direction due to the influence of impact pulses. The tool 6 may be connected to the impact hammer 3 by a retention member 20. The rear body 18b of the impact hammer comprises a percussion device 5 for generating impact pulses and transmitting them to the tool 6. The percussion device 5 may be provided with an impact piston 21 which can be moved to and fro in the axial direction by supplying pressure medium to its one or more operating pressure surfaces. There are also other ways for moving the impact piston 21. The impact piston 21 may be arranged to strike an impact surface 22 provided in the tool 6 during an impact movement, which generates the impact pulse required in breaking. The operation of the percussion device 5 may also be based on an impact element that does not perform a to-and-fro impact movement.

It can further be seen from FIG. 3 that the impact hammer 3 may be provided with a lubricating system for lubricating the bearing means 19 of the tool 6. The lubricating system comprises one or more lubricant channels 23, along which lubricant can be fed into one or more bearing means 19. In the case illustrated in FIG. 3, the same lubricant channel 23 leads both to the first bearing sleeve 19a and to the second bearing sleeve 19b. The lubricating system may further include at least one lubricating device 24, which may comprise one or more lubricant containers 25 and one or more transfer devices 26. The lubricating device 24 may be arranged transversely in the rear portion of the rear body 18b, i.e. in a valve house, as illustrated in FIG. 3. The lubricating device 24 and its components may be integrated into a common unit. The lubricant container 25 may be an elongated cylindrical space which may be machined into the body 18, in which case it is a fixed part of the body 18. At least one end of the lubricant container 25 may be provided with a cover including the transfer device 26. The lubricant container 25 may comprise a dividing member 27, which may be a rodless piston, which is sealed against the inner surfaces of the cylindrical space and which can move in the longitudinal direction of the cylindrical space. The dividing member 27 divides the lubricant container 25 into a pressure space 28 and a lubricant space 29. The pressure space 28 may be connected to the pressure medium circuit of the percussion device 5 by means of a channel 30, in which case the pressure acting in the pressure space 28 tries to push the dividing member towards the lubricant space 29. In the solution illustrated in FIG. 3, pressure medium is fed into the pressure space 28 from a pressure accumulator 31, but pressure medium may also be supplied from another suitable pressure source. Lubricant can be fed into the lubricant space 29 through a feed channel 32. The feed channel 32 may be provided with a connector, which may be connected to a lubricant tank which is located outside the rock breaking machine and from which a necessary amount of lubricant can be fed into the lubricant space 29 for storage. The lubricant space 29 is further connected to the transfer device 26, which may control the feed of lubricant from the lubricant space 29 into the lubricant channel 23. The lubricant may be grease, vaseline or another corresponding lubricant suitable for lubricating the bearing members of the tool of the rock breaking machine. The operator of the rock breaking machine may feed the desired lubricant into the lubricant space 29 through the feed channel 32.

Figure 4:
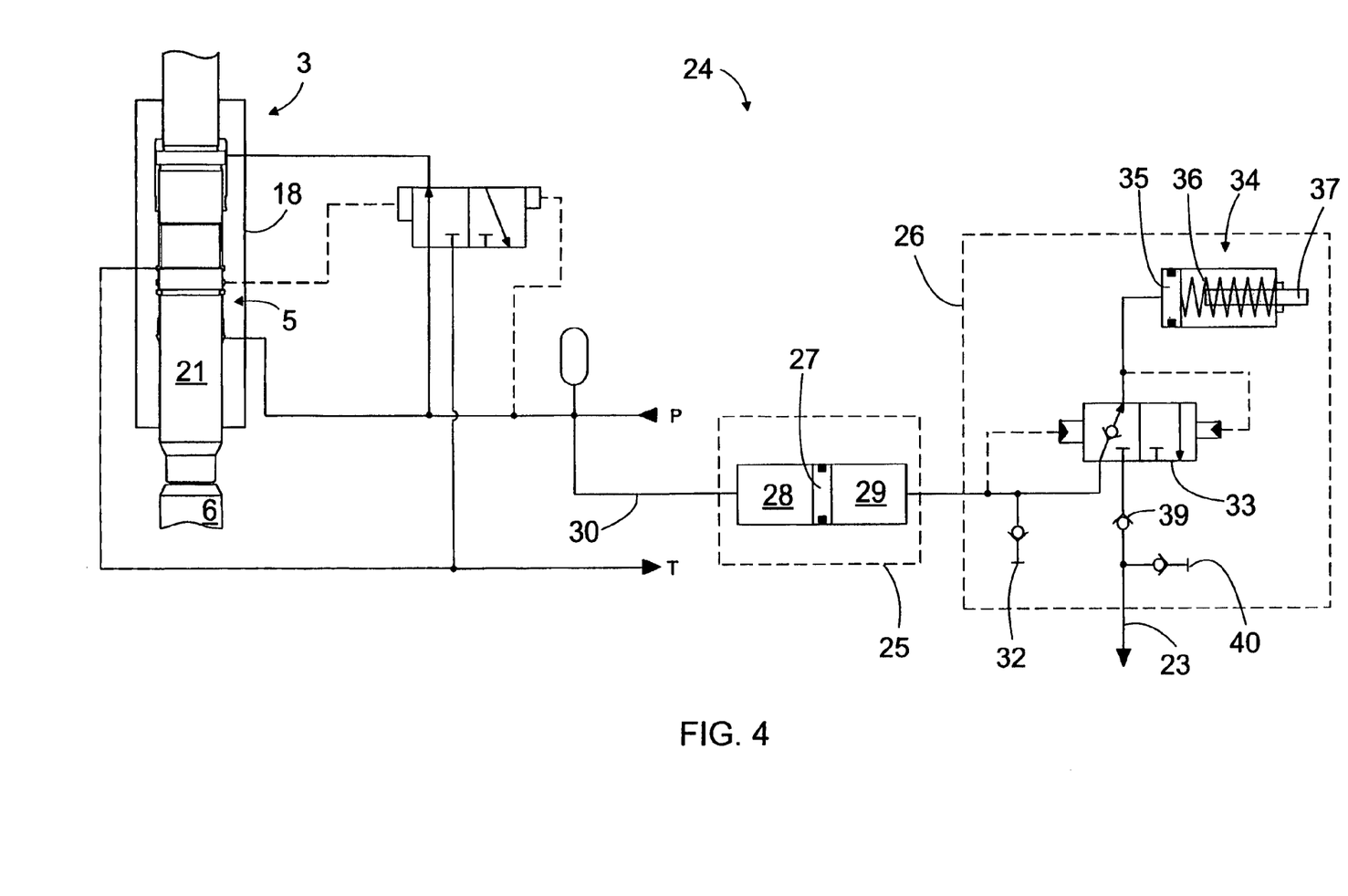
Figure 5:
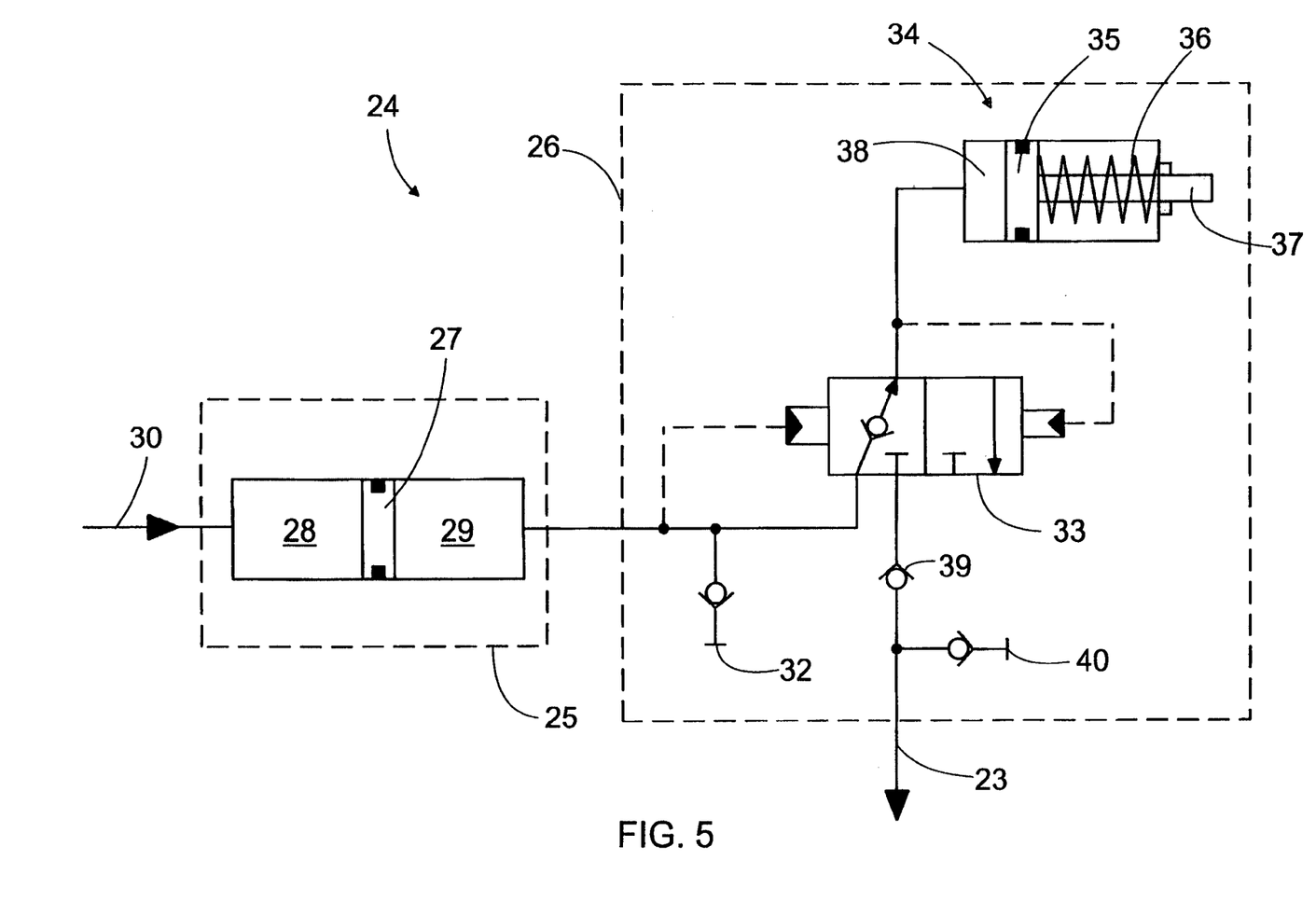
Figure 6:
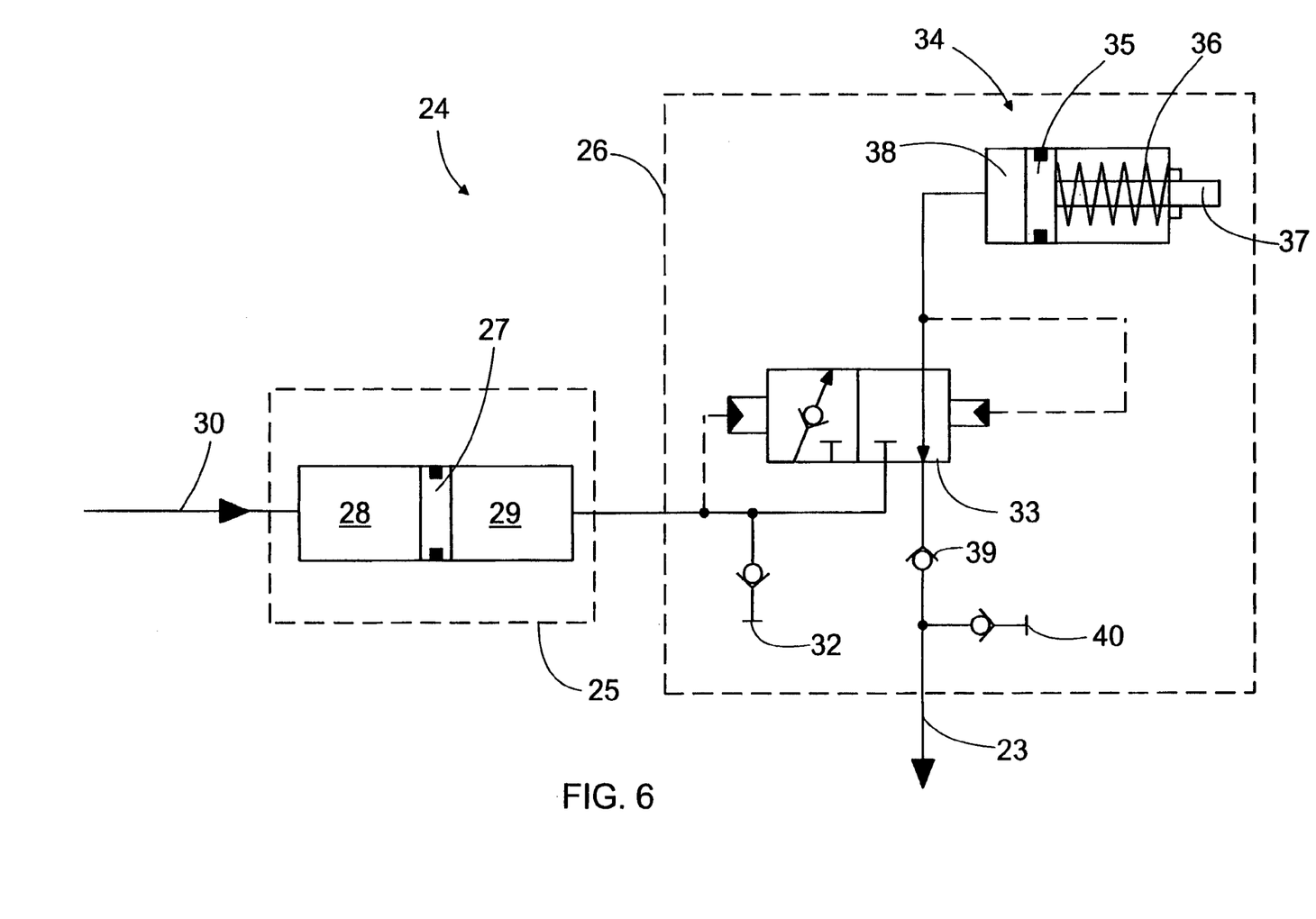
Figure 7:
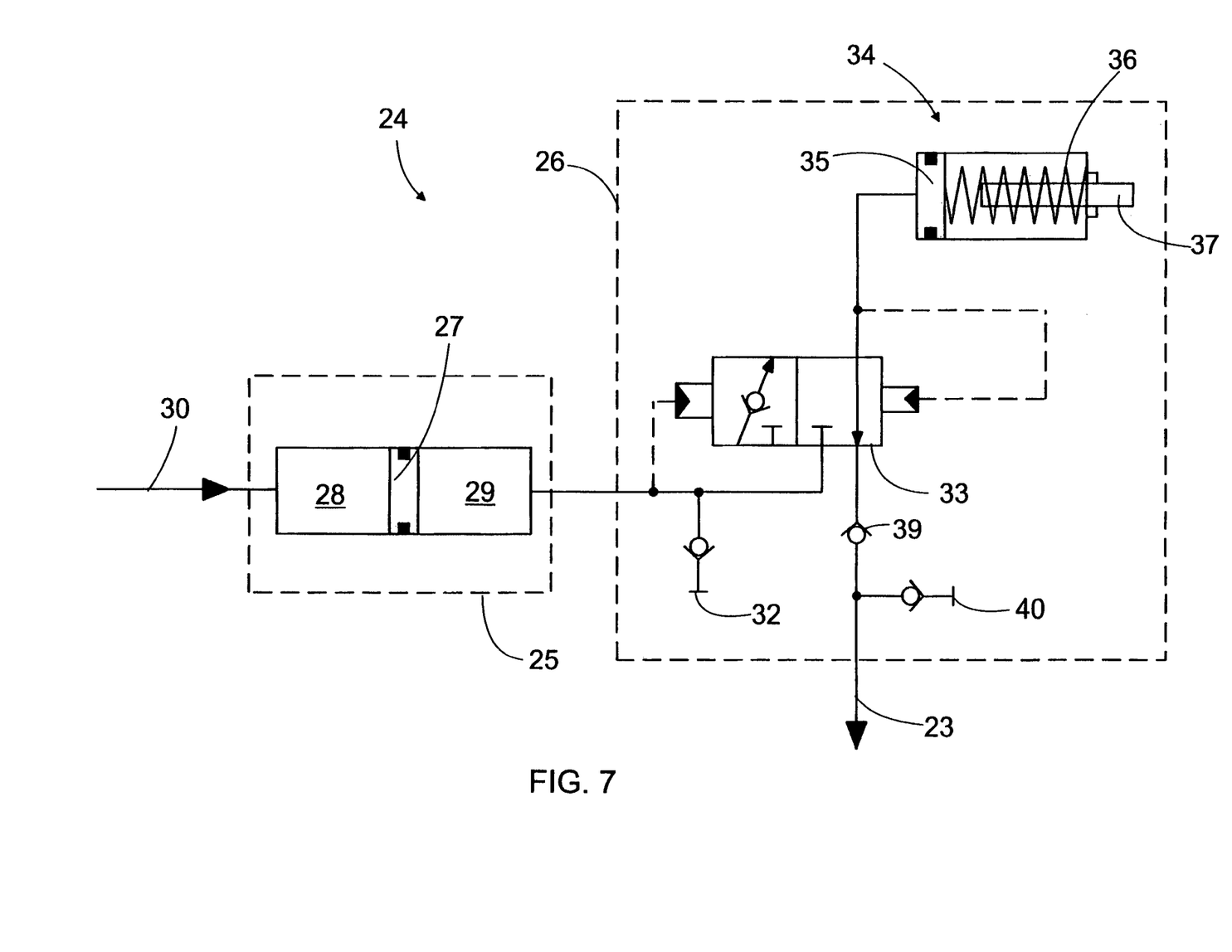

FIG. 4 illustrates a lubricating system according to the invention and components belonging to it, and FIGS. 5 to 7 further illustrate the operation of the lubricating system illustrated in FIG. 4. For the sake of clarity, the components belonging to the lubricating system are shown outside the body 18 of the impact hammer 3 in FIGS. 4 to 7.

FIG. 4 illustrates the lubricating system in an unpressurized state, i.e. the impact hammer 3 is still. In the situation shown in FIG. 5, the percussion device has been started, in which case the pressure in the working circuit of the percussion device acts on the pressure space 28 of the lubricant container 25 through the channel 30, pushing the dividing member 27 towards the lubricant space 29 and pressurizing the lubricant provided therein. The transfer device 26 may comprise a control valve 33 for controlling the flow of lubricant. When the control valve 33 is in the position shown in FIGS. 4 and 5, it allows lubricant to flow from the lubricant space 29 through the control valve 33 to a feed element 34. The feed element 34 comprises a push member 35, such as a rodless piston, which is arranged to be pushed to the left in the figure by a spring member 36. The push member 35 may be arranged in a cylindrical space where it can move in the longitudinal direction of the cylindrical space. The push member 35 may be sealed against the inner surfaces of the cylindrical space. Furthermore, the movement of the push member 35 to the right in the figure can be limited by an adjuster screw 37, for example. In FIG. 4, the spring member 36 has pushed the push member 35 into its extreme position on the left. In FIG. 5, the lubricant supplied through the control valve 33 pushes the push member 35 to the right in the figure while the spring member 36 resists the movement of the push member 35. The travel of the push member 35 is limited by the adjuster screw 37. The size of the lubricant portion to be fed into the lubricant channel 23 can be adjusted by the adjuster screw 37 since a feed space 38 is formed on the left side of the push member 35 for receiving the lubricant portion fed at a given time. The volume of the feed space 38 is determined by the product of the operating surface area and travel of the push member 35. In FIG. 5, the transfer device 26 has been loaded to feed the lubricant portion provided in the feed space 38. The transfer device 26 remains in this loaded position until the control valve 33 is acted on again.

In the situation illustrated in FIG. 6, the percussion device 5 is still, and thus the pressure of the pressure medium decreases in the channel 30. In that case, the control valve 33 is arranged to change its position from the right to the left since the pressure of the feed space 38 acts on the control head of the valve, the pressure being higher than the pressure acting on the left control head of the control valve 33. After the control valve 33 has changed its position, the push member 35, driven by the spring member 36, pushes the lubricant portion provided in the feed space 38 through the control valve 33 and a non-return valve 39 into the lubricant channel 23. The spring member 36 pushes the push member 35 into its extreme position on the left, as illustrated in FIG. 7. In FIG. 7, the lubricating system is in a dormant state and it is not activated to be loaded for feeding a new lubricant portion until the percussion device 5 is started again.

The spring member 36 of the feed element 34 illustrated in FIGS. 4 to 7 can be replaced by another power unit, such as a pressure accumulator, a pressure medium operated actuator or an elastic element. The volume of the feed space 38 can also be adjusted by an adjusting member other than the adjuster screw 37. In addition, the control valve 33 need not be pressure controlled but it can be controlled electrically by commands given by a separate control unit, for instance.

It is also feasible to arrange one lubricant container 25 to feed lubricant to several feed elements 34. In that case, each feed element 34 may be arranged to control the feed of lubricant to the desired bearing members. Furthermore, each feed element 34 may be adjusted to feed a lubricant portion with a desired size. Such a solution also makes the structure simple and takes less space.

The lubricating system may also comprise a connector 40, which enables manual feed of lubricant into the lubricant channel 23.

In some cases, the transfer device included in the lubricating device may be an electrically operated, hydraulic or pneumatic pump or a similar device, which may be arranged separately from the lubricant container.

Figure 8:
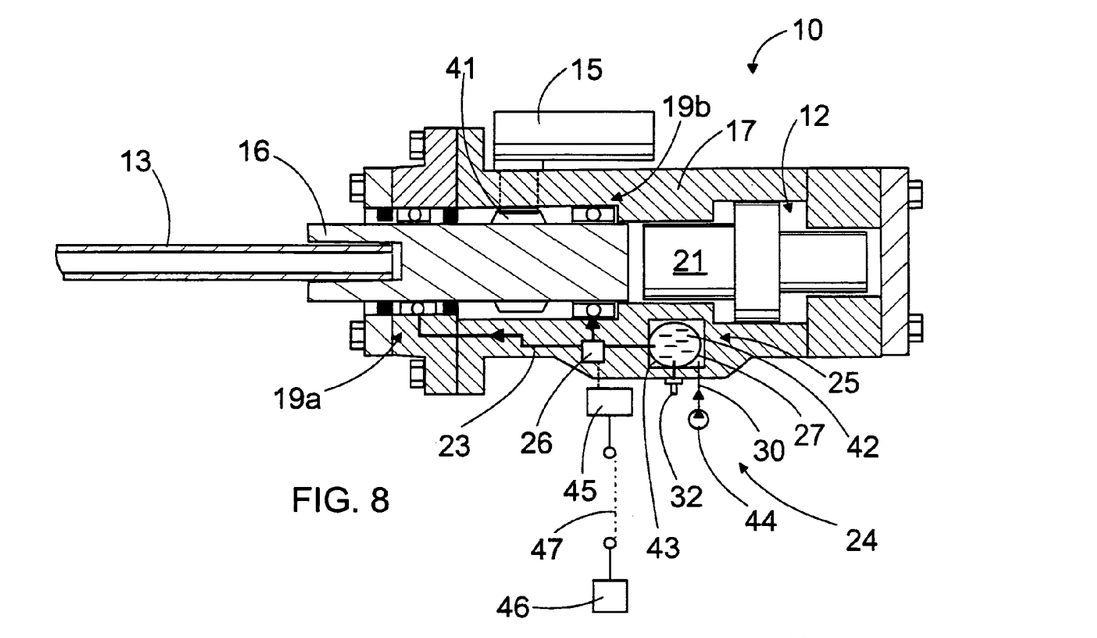
FIG. 8 is a schematic and cross-sectional view of a rock drilling machine and a lubricant container integrated into its body.
Figure 9:
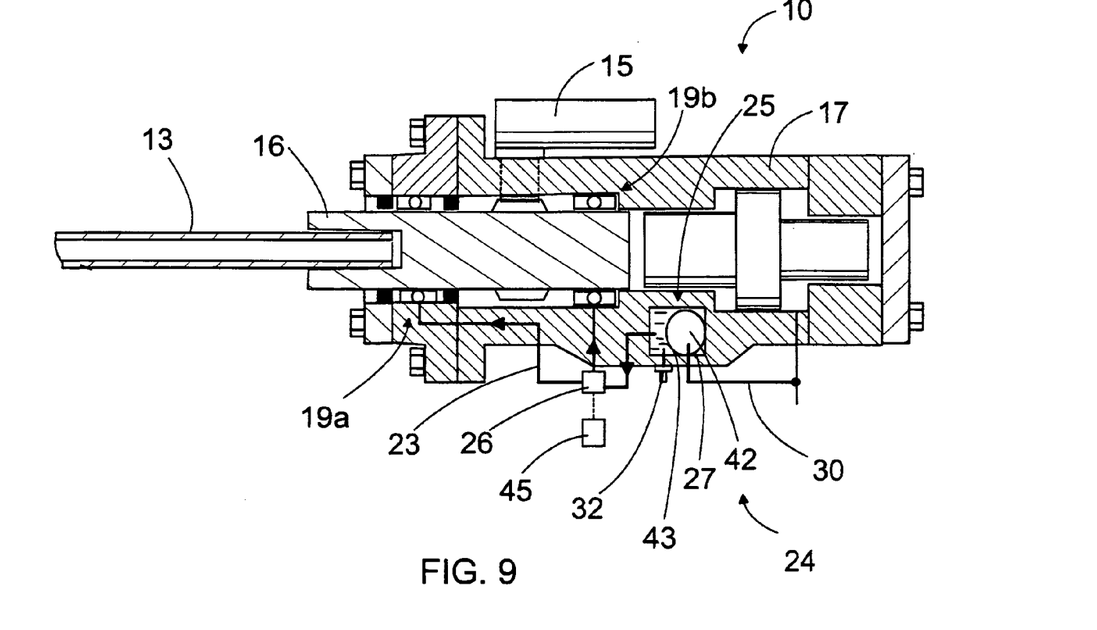
FIG. 9 is a schematic and cross-sectional view of a rock drilling machine and a lubricant container integrated into its body.

FIGS. 8 and 9 illustrate a rock drilling machine 10, which comprises a percussion device 12 for generating impact pulses in the tool 13. In this application, the tool also refers to a shank 16 to which the actual tool 13 may be attached. A rotation device may be arranged to rotate the tool by rotation members 41, the tool being bearing-mounted in to the body 17 by bearing means 19a and 19b. Lubricant can be fed into the bearing means 19a and 19b from the lubricating device 24 by one or more lubricant channels 23.

In the solution according to FIG. 8, the lubricant container 25 comprises a hollow space formed in the body 17, the space being provided with a bag-like dividing member 27. Lubricant can be fed into the inner space 42 defined by the dividing member 27 through the feed channel 32. The pressure of pressure medium can be supplied to the space between the outer surface of the dividing member 27 and the inner surface of the lubricant container 25 from a channel 30, which may be connected to a pump 44 or another pressure source. In that case, the pressure acting in the space 43 tries to compress the dividing member 27, and thus the lubricant in the space 42 is pushed to the transfer device 26 by pressure. The transfer device 26 may comprise a control valve for controlling the flow of pressurized lubricant into the lubricant channel 23. If necessary, the transfer device 26 may be provided with a pumping device for increasing the lubricant pressure. The transfer device 26 can be controlled by a first control unit 45, to which control commands can be transmitted from a second control unit 46, which may be placed outside the rock breaking machine, for example in a control cabin. A command to feed lubricant to a bearing member 19a, 19b can be transmitted from the second control unit 46 over a wireless data transmission connection 47, for example. There are also other ways for remote controlling the lubricating system.

The bag-like dividing member 27 illustrated in FIG. 8 may be fixed in the hollow space provided in the body 17 or it may be a detachable piece which can be detached from the body for service, filling or replacement, for example. On the other hand, the detachable lubricant space may have a structure different from a bag. The detachable lubricant space may thus be a kind of cartridge which can be arranged in the cylindrical hollow space formed in the body of the rock breaking machine so that the body encloses the cartridge. In some cases, the cartridge may comprise, in addition to the lubricant space, a pressure space and a piston or another dividing member that separates these spaces from each other.

The lubricating system shown in FIG. 9 differs from the solution illustrated in FIG. 8 for example in that the inner space 42 defined by the dividing member 27 functions as a pressure space and the space 43 between the outer surface of the dividing member 27 and the inner surface of the lubricant container 25 functions as a lubricant space. A further difference is that the transfer device 26 is located outside the body 17, in a suitable place. A control command can be given to the transfer device 26 from a first control unit 45, for which one or more control strategies may have been defined for automatically lubricating the bearing members 19a, 19b. If necessary, the control strategy may be modified as the operating conditions of the rock breaking machine change, for example. At its simplest, the transfer device 26 may be a control valve which controls the feed of lubricant into the lubricant channels 23. The lubricant container 25 and its components can be dimensioned to achieve a sufficient lubricant pressure so that no other means for further increasing the pressure are necessarily needed. The feed of lubricant may take place continuously, periodically or by portions. The lubricating system may be arranged to feed lubricant at predetermined intervals or according to a certain operating cycle of the rock breaking machine. At its simplest, the lubricating device can be controlled manually. In that case, the operator of the rock breaking machine may give a command to the lubricating system to feed a lubricant portion to the bearing means of the tool.

The solutions according to FIGS. 4 to 7 are also applicable in connection with a rock drilling machine, and correspondingly, the solutions according to FIGS. 8 and 9 are applicable in connection with impact hammers. Furthermore, the solutions and features described in this application can be combined to achieve various combinations. On the other hand, the features may also be used as such.

The simplest lubricating system is a system where the lubricating device is a manually operated device, such as a manual pump or the like. Regardless of what kind of lubricating device is used and how it is operated, the lubricant container is any case arranged in connection with the body of the rock breaking hammer.

It should be noted that the way in which the impact pulses needed to break rock or a corresponding material are generated in the tool 6 is not relevant to the invention. Instead, what is relevant is that lubricant is supplied to the bearing members of the tool by means of the lubricating system according to the invention.

The drawings and the related description are only intended to illustrate the inventive concept. The details of the invention may vary within the scope of the claims.

What is claimed is:

1. A rock breaking machine comprising:
    a body;
    an impact device inside the body for generating impact pulses in a tool that is connectable to the rock breaking machine;
    bearing members for supporting the tool onto the body of the rock breaking machine;
    a lubricating system for lubricating the bearing members, the lubricating system comprising at least one lubricant channel, and at least one lubricating device for feeding lubricant along the lubricant channel to the bearing members of the tool;
    the lubricating device comprising at least one lubricant container and a transfer device for feeding lubricant,
    the lubricant container being arranged inside the body of the rock breaking machine and being enclosed therein, and wherein
    the volume of the lubricant container is divided into a pressure space and a lubricant space by a dividing member, which is arranged to affect the volumes of the pressure space and lubricant space;
    the pressure space is connected to a pressure medium channel, which allows pressurization of the pressure space by feeding pressure medium therein;
    lubricant is storable in the lubricant space;
    the pressure of the pressure medium acting in the pressure space is arranged to pressurize the lubricant in the lubricant space by means of the dividing member;
    and the lubricant space is connected to a transfer device, which is arranged to control the feed of lubricant from the lubricant space into the lubricant channel, and wherein the transfer device is arranged to feed lubricant at the moment the impact device stops generating impact pulses;
    the transfer device comprises a feed element, which is arranged to receive a predetermined lubricant portion from the lubricant container and is arranged to feed the predetermined lubricant portion into the lubricant channel;
    the transfer device further comprises a control valve for controlling the operation of the feed element and including a first control position and a second control position, in which both control positions the flow of lubricant through the control valve is allowed, said control valve being moved between the first and second control positions by the pressure of the feed space and lubricant space;

and when the control valve is in the first control position it controls the loading of the predetermined lubricant portion into the feed element and when it is in the second control position it controls feeding of the predetermined lubricant portion into the lubricant channel.

2. A rock breaking machine according to claim 1, wherein the lubricant channel and the lubricating device belonging to the lubricating system are integrated into the body of the rock breaking device.

3. A rock breaking machine according to claim 1, wherein the lubricant container is a cylindrical space formed in the body of the rock breaking machine;
and the dividing member is a piston, which is sealed against cylinder surfaces of the lubricant container and arranged to move freely in the longitudinal direction of the lubricant container according to the pressure difference between the pressures acting in the pressure space and lubricant space.

4. A rock breaking machine according to claim 1, wherein the lubricant container comprises a hollow space formed in the body and provided with an inner surface;
the dividing member is a bag-like part arranged to define a first space inside itself;
a second space is arranged to be formed in the space defined by the outer surface of the bag-like dividing member and the inner surface of the lubricant container;
the pressure of the pressure medium is arranged to be supplied to one space defined by the dividing member to pressurize this space;
and wherein lubricant is arranged to be supplied to another space defined by the dividing member.

5. A rock breaking machine according to claim 1, wherein the impact device is a hydraulic device to which pressure fluid is fed from a hydraulic circuit; and
the pressure space of the lubricant container is connected to the hydraulic circuit of the impact device for pressurizing the pressure space.

6. A rock breaking machine according to claim 1, wherein the feed element includes a push member arranged in a cylindrical feed space and arranged to be pushed in a first direction by means of a mechanical spring member;
and wherein the pressurized lubricant supplied through the control valve in the first control position is arranged to push the push member towards a second direction of movement against the force of the spring member;
and when the control valve is changed into the second control position the push member driven by the spring member, pushes the lubricant from the feed space through the control valve into the lubricant channel.

7. A rock breaking machine according to claim 1, wherein the feed element is provided with a feed space for receiving a predetermined lubricant portion from the lubricant container as the transfer device is loaded for feeding lubricant;
and the feed element comprises a push member arranged to push the lubricant portion provided in the feed space into the lubricant channel as the feed element is triggered according to a predetermined control strategy; and
wherein the impact device is pressure medium operated;
the transfer device is arranged to be loaded as the impact device is pressurized;
and wherein the transfer device is triggered as the impact device is stopped and the pressure discharges therefrom.

8. A rock breaking machine according to claim 1, wherein the rock breaking machine is an impact hammer.

9. A rock breaking machine according to claim 1, wherein the rock breaking machine is a rock drilling machine.

10. A rock breaking machine according to claim 1, wherein the body of the rock breaking machine is provided with a hollow space,
and the lubricant container is a detachable part which can be arranged in the hollow space.

11. A rock breaking machine comprising:
a body;
an impact device inside the body for generating impact pulses in a tool that is connectable to the rock breaking machine;
bearing members for supporting the tool onto the body of the rock breaking machine;
a lubricating system for lubricating the bearing members, the lubricating system comprising at least one lubricant channel, and at least one lubricating device for feeding lubricant along the lubricant channel to the bearing members of the tool;
the lubricating device comprising at least one lubricant container and a transfer device for feeding lubricant,
the lubricant container being arranged inside the body of the rock breaking machine and being enclosed therein,
and wherein
the volume of the lubricant container is divided into a pressure space and a lubricant space by a dividing member, which is arranged to affect the volumes of the pressure space and lubricant space;
the pressure space is connected to a pressure medium channel, which allows pressurization of the pressure space by feeding pressure medium therein;
lubricant is storable in the lubricant space;
the pressure of the pressure medium acting in the pressure space is arranged to pressurize the lubricant in the lubricant space by means of the dividing member;
and the lubricant space is connected to a transfer device, which is arranged to control the feed of lubricant from the lubricant space into the lubricant channel;
the transfer device comprises a feed element, which is arranged to receive a predetermined lubricant portion from the lubricant container and is arranged to feed the predetermined lubricant portion into the lubricant channel;
the transfer device further comprises a control valve for controlling the operation of the feed element and including a first control position and a second control position, with in which the control valve allows the flow of lubricant through it in both control positions, said control valve being moved between the first and second control positions by the pressure of the feed space and lubricant space;
and when the control valve is in the first control position it controls the loading of the predetermined lubricant portion into the feed element and when it is in the second control position it controls feeding of the predetermined lubricant portion into the lubricant channel.

12. A rock breaking machine comprising:
a body;
an impact device inside the body for generating impact pulses in a tool that is connectable to the rock breaking machine;
bearing members for supporting the tool onto the body of the rock breaking machine;
a lubricating system for lubricating the bearing members, the lubricating system comprising at least one lubricant channel, and at least one lubricating device for feeding lubricant along the lubricant channel to the bearing members of the tool;

the lubricating device comprising at least one lubricant container and a transfer device for feeding lubricant, the lubricant container being arranged inside the body of the rock breaking machine and being enclosed therein, and wherein the volume of the lubricant container is divided into a pressure space and a lubricant space by a dividing member, which is arranged to affect the volumes of the pressure space and lubricant space;

the pressure space is connected to a pressure medium channel, which allows pressurization of the pressure space by feeding pressure medium therein;

lubricant is storable in the lubricant space;

the pressure of the pressure medium acting in the pressure space is arranged to pressurize the lubricant in the lubricant space by means of the dividing member;

and the lubricant space is connected to a transfer device, which is arranged to control the feed of lubricant from the lubricant space into the lubricant channel, and wherein the transfer device is arranged to feed lubricant at the moment the impact device stops generating impact pulses;

the transfer device is arranged to control the feed of pressurized lubricant into the lubricant channel;

the transfer device comprises a feed element including a push member arranged in a cylindrical feed space and arranged to be pushed in a first direction by means of a spring member;

the transfer device further comprises a control valve for controlling the flow of lubricant from the lubricant space of the lubricant container to the feed element and being movable between a first control position and a second control position;

and wherein the pressurized lubricant supplied through the control valve in the first control position is arranged to push the push member towards a second direction of movement against the force of the spring member;

and when the control valve is moved into the second control position the push member driven by the spring member, pushes the lubricant from the feed space through the control valve into the lubricant channel.

13. A rock breaking machine comprising:

a body;

an impact device inside the body for generating impact pulses in a tool that is connectable to the rock breaking machine;

bearing members for supporting the tool onto the body of the rock breaking machine;

a lubricating system for lubricating the bearing members, the lubricating system comprising at least one lubricant channel, and at least one lubricating device for feeding lubricant along the lubricant channel to the bearing members of the tool;

the lubricating device comprising at least one lubricant container and a transfer device for feeding lubricant, the lubricant container being arranged inside the body of the rock breaking machine and being enclosed therein, and wherein the volume of the lubricant container is divided into a pressure space and a lubricant space by a dividing member, which is arranged to affect the volumes of the pressure space and lubricant space;

the pressure space is connected to a pressure medium channel, which allows pressurization of the pressure space by feeding pressure medium therein;

lubricant is storable in the lubricant space;

the pressure of the pressure medium acting in the pressure space is arranged to pressurize the lubricant in the lubricant space by means of the dividing member;

and the lubricant space is connected to a transfer device, which is arranged to control the feed of lubricant from the lubricant space into the lubricant channel, and wherein the transfer device is arranged to feed lubricant at the moment the impact device stops generating impact pulses;

wherein the transfer device is arranged to control the feed of pressurized lubricant into the lubricant channel;

the transfer device comprises a feed element provided with a feed space for receiving a predetermined lubricant portion from the lubricant container as the transfer device is loaded for feeding lubricant;

and the feed element comprises a push member arranged to push the lubricant portion provided in the feed space into the lubricant channel as the feed element is triggered according to a predetermined control strategy; and wherein the impact device is pressure medium operated;

the transfer device is arranged to be loaded as the impact device is pressurized;

and wherein the transfer device is triggered at the moment the impact device stops generating impact pulses and the pressure discharges therefrom;

the transfer device further comprises a control valve for controlling the operation of the feed element and including a first control position and a second control position, in which both control positions the flow of lubricant through the control valve is allowed, said control valve being moved between the first and second control positions by the pressure of the feed space and lubricant space;

and when the control valve is in the first control position it controls the loading of the predetermined lubricant portion into the feed element and when it is in the second control position it controls feeding of the predetermined lubricant portion into the lubricant channel.

14. A rock breaking machine comprising:

a elongated body;

an impact device inside the elongated body for generating impact pulses in a tool that is connectable to the rock breaking machine;

bearing members for supporting the tool onto the elongated body of the rock breaking machine;

a lubricating system for lubricating the bearing members, the lubricating system comprising at least one lubricant channel, and at least one lubricating device for feeding lubricant along the lubricant channel to the bearing members of the tool;

the lubricating device comprising at least one lubricant container and a transfer device for feeding lubricant, the lubricant container being arranged inside the elongated body of the rock breaking machine and being enclosed therein, and wherein the volume of the lubricant container is divided into a pressure space and a lubricant space by a dividing member, which is arranged to affect the volumes of the pressure space and lubricant space;

the pressure space is connected to a pressure medium channel, which allows pressurization of the pressure space by feeding pressure medium therein;

lubricant is storable in the lubricant space;

the pressure of the pressure medium acting in the pressure space is arranged to pressurize the lubricant in the lubricant space by means of the dividing member;

and the lubricant space is connected to a transfer device, which is arranged to control the feed of lubricant from the lubricant space into the lubricant channel, and wherein the transfer device is arranged to feed lubricant at the moment the impact device stops generating impact pulses;

the lubricant container and the transfer device are arranged one after another in the lubricating device, and the lubricating device is arranged transversely to the elongated body of the breaking machine;

the transfer device comprises a feed element, which is arranged to receive a predetermined lubricant portion from the lubricant container and is arranged to feed the predetermined lubricant portion into the lubricant channel;

the transfer device further comprises a control valve for controlling the operation of the feed element and including a first control position and a second control position, in which both control positions the flow of lubricant through the control valve is allowed, said control valve being moved between the first and second control positions by the pressure of the feed space and lubricant space;

and when the control valve is in the first control position it controls the loading of the predetermined lubricant portion into the feed element and when it is in the second control position it controls feeding of the predetermined lubricant portion into the lubricant channel.

* * * * *